_3,749,686_
OIL MODIFIED POLYURETHANE COATINGS
Joseph A. Pawlak, Cheektowaga, Buffalo, and Claude Thomas Bean, Jr., Niagara Falls, N.Y., assignors to Hooker Chemical Corporation, Niagara Falls, N.Y.
No Drawing. Continuation of abandoned application Ser. No. 537,687, Mar. 28, 1966. This application Feb. 22, 1971, Ser. No. 117,811
Int. Cl. C08g 5/20
U.S. Cl. 260—19 A                                    11 Claims

ABSTRACT OF THE DISCLOSURE

This invention relates to oil modified polyurethane coatings and the process for making said coatings, comprising the steps of reacting from about 0.95 to 1.1 isocyanate groups on an organic polyisocyanate with each hydroxyl group on a polyol, wherein the polyol is formed by reacting from 1.1 to 4 moles of phenol with each mole of an aldehyde so as to form a novolak resin which has from about 1.1/1 to 2/1 phenolic groups per aldehydic group per molecule, alkylating the novolak resin with from about 0.1 to 2 moles of alkylating agent per mole of phenolic nucleus on the novolak resin, hydroxyalkylating the novolak resin with from about 1 to 6 moles of hydroxyalkylating agent per mole of phenolic hydroxyl on the novolak resin, and esterifying or transesterifying the hydroxyalkylated product with from 0.33 to 1 mole of esterifying or transesterifying agent per mole of hydroxyl on the hydroxyalkylated product. Varnishes and other coatings can be prepared from the oil modified polyurethanes of this invention and exhibit superior resistance to caustic.

---

This application is a continuation of Ser. No. 537,687, filed Mar. 28, 1966, now abandoned.

This invention relates to a process for preparing improved oil modified polyurethane coatings and to the compositions so made.

The prior art teaches the preparation of oil modified polyurethanes by reaction of organic diisocyanate with hydroxyglyceride drying and semi-drying oils, which oils are obtained by the alcoholysis of drying semi-drying oils with glycerine, trimethylol propane, or pentaerythritol; alternatively, said oils may be obtained by reacting the fatty acids of drying or semi-drying oils with the above mentioned polyols.

Varnishes prepared from such known oil modified polyurethanes have better abrasion resistance, hardness, flexibility and drying properties than alkyds and spar varnishes—but their resistance to caustic, however, is only marginally better than that of the alkyds and spar varnishes.

It is the object of this invention, thus, to provide a new class of oil modified polyurethane coatings which, while retaining the desirable properties of known polyurethane coatings, have caustic resistance properties which are markedly superior thereto. It is the further object of this invention to provide a new process for synthesizing these new coatings.

In accordance with this invention, there is provided a product of the process of reacting from about 0.95 to 1.1 isocyanate groups on an organic polyisocyanate with each hydroxyl group on a polyol, wherein the polyol is formed by reacting from about 1.1 to 4 moles of phenol with each mole of aldehyde or ketone so as to form a novolak which has from about 1.1 to 1 to 2 to 1 phenolic groups per aldehydic or ketonic groups per molecule, alkylating the novolak with from about 0.1 to 2.0 moles of alkylating agent per mole of phenolic nucleus on the novolak, hydroxyalkylating the novolak reaction product with from about 1 to 6 moles of hydroxyalkylating agent per mole of phenolic hydroxyl on the novolak resin, and esterifying or transesterifying the hydroxyalkylated product with from 0.33 to 1 mole of esterifying agent or transesterifying agent per mole of hydroxyl on the hydroxyalkylated product. This invention further provides a process for making said composition, the steps of which are mentioned above. The expressions "mole of phenolic hydroxyl," "mole of hydroxyl," and "mole of phenolic nucleus" used in this specification and claims refer to the respective formula weight expressed in weight units, in the same manner that "moles of alkylation agent" refers to the molecular weight expressed in weight units.

For the sake of convenience, this specification is divided into five parts:

Part I relates to the reaction of the phenol and aldehyde or ketone to create the novolak;

Part II relates to the alkylation of said novolak;

Part III describes the hydroxyalkylation of the novolak reaction product;

Part IV illustrates the esterification or transesterification of the hydroxyalkylated product; and Part V relates to the reaction of such esterified or transesterified product with organic polyisocyante.

PART I

The first step of this invention is to react a phenol with an aldehyde to prepare a novolak.

From about 1.1 to 4 moles of phenol may be used per mole of aldehyde. It is preferred to work within the range of 1.4 to 2.4, and best results are obtained when working in the range of 1.44 to 1.64.

In general, any acid whose dissociation constant is greater than $1\times 10^{-2}$ will work as a catalyst for this reaction. Some suitable acid catalysts are, e.g., oxalic acid, maleic acid, hydrochloric acid, sulfuric acid, or the like. With few exceptions, the reaction can be brought to completion more quickly if an anionic wetting agent is used along with the acid catalyst.

Alternatively, basic catalysts such as ammonia, amines, quaternary ammonium bases, and lime, can be used.

This reaction may even be run without a catalyst. In such an event, however, one must introduce the formaldehyde beneath the surface of the phenol at a temperature of 150 to 180 degrees centigrade to effect the reaction.

Atmospheric pressure is used for the reaction. Higher pressures may be used to facilitate the reaction, but sometimes may result in the production of undesirable gelled or very high molecular weight particles.

The phenol, catalyst, and wetting agents are agitated and heated to about 41 to 165 degrees centigrade and then formaldehyde is added to this mixture. Refluxing is maintained until all of the formaldehyde has reacted. The reaction temperature is usually in the range of 95 to 100 degrees centigrade at atmospheric pressure. However, higher and lower pressures can be employed, and the temperature can be adjusted higher or lower as required. After the reaction is completed, water is distilled off, and free phenol is removed by vacuum distillation at a temperature of from 150 to 200 degrees centigrade, preferably within the range of 190 to 200 degrees centigrade.

It is desired to form a novolak which has from about 1.1 to 2 phenolic groups per aldehydic groups per molecule. Preferably, the ratio will range from about 1.2 to 1.5; an even more preferred range is from about 1.25 to 1.33.

The phenol-aldehyde condensate should be soluble in organic solvents such as acetone, and should not be advanced to the insoluble "C" or resite stage. When the phenol is phenol itself and the aldehyde is formaldehyde, one type of condensate which is highly satisfactory contains condensation units which may be exemplified by the formula:

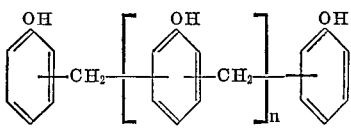

where *n* is from about 0 to 11. The value of *n* may even be higher, provided that the resin is fusible and acetone- or organic solvent-soluble.

Examples of phenols which may be used in preparing phenol-aldehyde condensates for use in practicing the invention include phenol itself, which is the preferred species, or substituted phenols having the general formula:

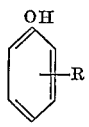

where R may be F, Cl, Br, or a suitable substituent selected from the following:

(a) Alkyl groups of 1 to 18 carbons in any of their isomeric forms substituted on the phenolic nucleus in the ortho, meta or para positions;

(b) Alicyclic groups of 5 to 18 carbon atoms, such as cyclohexyl, cyclopentyl, methylcyclohexyl, butylcyclohexyl;

(c) Aromatic or aralkyl groups of 6 to 18 carbon atoms, such as phenyl, alphamethylbenzyl, benzyl, or cumyl;

(d) Alkyl, alicyclic, aryl, and aralkyl ketone groups wherein the hydrocarbon portion thereof is as hereinbefore described;

(e) Alkyl, alicyclic, aryl, and aralkyl carbocyclic groups wherein the hydrocarbon moiety thereof is defined hereinbefore;

(f) And mixtures thereof.

Suitable substituted phenols include the following: para-tertiary-butyl phenol; para-secondary-butyl phenol; para-tertiary - hexyl phenol; para - isooctyl-phenol; para-phenyl phenol; para - benzyl phenol; para - cyclohexyl phenol; para-decyl phenol; para-octadecyl phenol; para-nonyl phenol; para-methyl phenol; para-pentadecyl phenol; para-cetyl phenol; para-cumyl phenol; para-hydroxy acetophenone; para-hydroxy benzophenone; and ortho and meta derivatives of all of the aforementioned phenols, such as meta-butyl phenol and ortho-butyl phenol; and mixtures of the aforementioned phenols.

From the foregoing, it is apparent that various phenols may be used in practicing the present invention provided they have a reactive phenolic hydroxyl group and are capable of reacting with aldehydes or ketones to produce a condensate. The pure refined phenols may be used, but this is often unnecessary.

In the condensation of the phenol to provide the novolak, any suitable aldehyde or mixture of aldehydes capable of reacting with the phenol and having up to about eight carbon atoms is satisfactory provided it does not contain a functional group or structure detrimental to the condensation reaction or to the alkylation, oxyalkylation, esterification or transesterification of the condensation product. The preferred aldehyde is formaldehyde, which can be in aqueous solution or in any of its low polymeric forhs, such as paraform or trioxane. Other examples of aldehydes which will work in this invention include acetaldehyde, propionaldehyde, butyraldehyde, benzaldehyde, furfuraldehyde, 2-ethylhexanal, ethylbutyraldehyde, heptaldehyde, and the like.

The condensation of the phenols may also be carried out using an aliphatic ketone having from three to eight carbon atoms. Such ketones are acetone, methylethyl ketone, diethylketone, ethylpropyl ketone, dipropylketone, propylbutyl ketone, as well as cycloaliphatic ketones having five to eight carbon atoms, such as cyclopentanone, cyclohexanone and cyclooctanone.

PART II

The novolak, described in Part I, is now alkylated by a monovinyl compound or a mixture of such compounds.

From about 0.1 to 2 moles of alkylating agent are used per mole of phenolic hydroxyl on the novolak. It is preferred to work within the range of 0.25 to 1 and best results are obtained when working in the range of 0.4 to 0.6.

The alkylating agent may be represented by the formula:

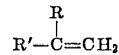

where R may be H, F, Cl, Br, or a suitable substituent selected from the following:

(a) Alkyl groups of 1 to 18 carbons in any of their isomeric forms;

(b) Alicyclic groups of 5 to 18 carbons, such as cyclohexyl, cyclopentyl, methylcyclohexyl, butylcyclohexyl;

(c) Aromatic or aralkyl groups of 6 to 18 carbon atoms such as phenyl, alphamethylbenzyl, benzyl or cumyl; and wherein R′ is hydrogen or an alkyl group of 1 to 18 carbons, in any of their isomeric forms.

The preferred alkylating agent is styrene. Examples of other alkylating agents which work in this invention include chlorostyrene, methylstyrenes, such as alphamethyl styrenes; paramethyl styrenes; indene; unsaturated esters, such as methyl methacrylate, methylacrylate, allyl acetate, vinyl acetate, and vinyl toluene; the lower aliphatic esters other than methyl of methacrylic and acrylic acids; and so forth.

Lewis acids can be used as catalysts for the alkylation reaction. Examples of catalysts which work in this invention include phosphoric acid, sulfuric acid, oxalic acid, ferric chloride, stannic chloride. The preferred catalyst is sulfuric acid.

Superatmospheric pressure may be utilized for this reaction, especially if the alkylating agent used is low boiling. The reaction, however, is generally run at atmospheric pressure.

The reaction temperature may be from 50 to 200 degrees centigrade, with a preferred range of 110 to 200 degrees centigrade, and an even more preferred range of 120 to 175 degrees centigrade. The novolak is heated and agitated under an inert atmosphere such as nitrogen, until it is fluid. If low temperatures of alkylation are desired, solvents can be employed. The catalyst is added to the fluid novolak, and then the alkylating agent is added in such a manner as to minimize exotherm. To prevent excessive refluxing, cooling may be necessary. The reaction is usually completed upon the addition of the alkylating agent, but the reaction mixture can be held at the alkylating temperature for an additional 1 to 2 hours to insure that the alkylation reaction is completed.

PART III

The alkylated novolak, described in Part II, is now hydroxyalkylated.

From about 1 to 6 moles of hydroxyalkylating agent may be used per mole of phenolic hydroxyl on the alkylated novolak. It is preferred to work within the range of about 1 to 2.5, and best results are obtained when working in the range of about 1 to 1.5.

The preferred class of hydroxyalkylating agents is that monoxirane ring compounds of the general formula:

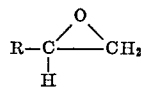

wherein R may be hydrogen, or a suitable substituent selected from the following:

(a) Alkyl groups of 1 to 18 carbons in any of their isomeric forms;

(b) Alicyclic groups of 5 to 18 carbons, such as cyclohexyl, cyclopentyl, methylcyclohexyl;

(c) Aromatic or aralkyl groups to 6 to 18 carbon atoms, such as phenyl, alphamethylbenzyl, benzyl or cumyl.

The preferred hydroxyalkylating agent is ethylene oxide. Other compounds which will work are propylene, butylene, styrene, and cyclohexane oxides, and epichlorohydrin. Many other monoepoxides can be used, but the alkylene oxides containing up to six carbons are generally used. Additional useful compounds are phenyl glycidyl ether, and related compounds prepared from the reaction of epichlorohydrin and monofunctional alkylated and halogenated phenols such as pentachlorophenyl.

The phenolic hydroxyl of the phenolic condensation product can also be hydroxyalkylated by reacting alkylene halohydrins with the phenolic hydroxyl, using equivalent amounts of an alkali metal hydroxide to bring about the reaction. Suitable alkylene halohydrins are ethylene chloro- or bromo-hydrins, propylene chloro- or bromo-hydrins, glyceryl chloro- or bromo-hydrins, 2,3-butylene chloro- or bromo-hydrins.

Still another method for hydroxyalkylating the novolak reaction product is by reaction with alkylene carbonates, such as ethylene carbonate and propylene carbonate.

Catalysts for the reaction of the oxirane ring compounds with the phenolic hydroxyl groups are alkali or alkaline earth metal hydroxides; primary amines; secondary amines; tertiary amines; or basic salts such as the salts of alkali metals or alkaline earth metals. These include sodium, potassium, lithium, calcium, and barium hydroxides; amines such as methyl, dimethyl, diethyl, trimethyl, tripropyl, dimethyl benzyl, dimethyl hydroxyethyl, and dimethyl-2-hydroxypropyl amines; and the salts of strong bases and weak acids, such as sodium acetate or benzoate. When the hydroxyalkylating agent used is ethylene oxide, the preferred catalysts are sodium acetate or triethylamine; when propylene oxide is used, sodium acetate and sodium benzoate are the preferred catalysts.

Alternatively, one may use as a catalyst the alkali metal salts of alkyl alcohols wherein the alkyl group is of one to eighteen carbons in any of its isomeric forms. Examples of such catalysts are sodium methylate, potassium ethylate, sodium decylate, and the like.

The alkylated novolak is agitated and heated under an inert atmosphere until it is fluid. Solvents such as xylene can be employed if low reaction temperatures are desired, but will result in higher reaction pressures. It is preferred to heat the alkylated novolak to 140 to 165 degrees centigrade without solvent, and then add the catalyst. The reactor is closed, and the hydroxyalkylating agent is added at such a rate as to control exotherm and pressure. It is preferred to work at a pressure of from 2 to 25 pounds/square inch gauge, but higher pressures can be employed if suitable equipment is available. The reaction temperature may be from 110 to 200 degrees centigrade, though it is preferred to work within the 150 to 200 degrees centigrade range; an even more preferred range is 150 to 180 degrees centigrade. The addition normally takes several hours at the 25 pounds per square inch gauge pressure, but lower reaction cycles can be achieved by use of higher pressures. For example, if triethylamine is used, the addition time is from 3 to 5 hours, and if sodium acetate is used, the addition time is from 2 to 4 hours. If triethylamine catalyst is used, approximately a 1:1 ratio moles of hydroxyalkylating agent per more of phenolic hydroxyl is reacted, and the excess hydroxyalkylating agent has to be removed after the reaction is completed. If sodium acetate is used as the catalyst, all the hydroxyalkylating agent reacts with the phenolic hydroxyls, and the reaction is essentially completed upon cessation of the addition of the hydroxyalkylating agent, as evidenced by a rapid drop in pressure. Generally, the proportion of catalysts is in the range of 0.06 to 2 weight percent based on total weight of alkylated novolak and hydroxylating agent. Reaction times can vary from 15 minutes to 4 hours or more.

PART IV

The hydroxyalkylated product may now be transesterified with drying oils, semi-drying oils, and mixtures thereof; with drying oils mixed with non-drying oils; with heat polymerized oils, and with blown oils.

From 0.33 to 1 mole of the oil(s) may be used per mole of hydroxyl on the hydroxyalkylated product; the preferred range is 0.33 to 0.42.

The above-mentioned oils may be characterized by the formula:

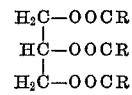

wherein R may be a saturated or unsaturated alkyl group of 1 to 22 carbons (but there must be some unsaturation in at least one of the R's). The preferred drying oil is safflower oil. Examples of other drying or semi-drying oils which work in this invention include linseed oil, soybean oil, cottonseed oil, corn oil, oiticica oil, tung oil, perilla oil, and dehydrated castor oil.

Alternatively, one may esterify the hydroxyalkylated novolak with either the fatty acids of said drying or semi-drying oils, or with alcohols, such as glycerine.

The hydroxyalkylated novolak and the drying or semi-drying oil are agitated and heated to the reaction temperature under an inert atmosphere. The reaction can be run at 200 to 300 degrees centigrade; preferably, it should be run at 230 to 260 degrees centigrade; an even more preferable range is 240 to 250 degrees centigrade. If the hydroxyalkylation was catalyzed by a catalyst containing alkali metal (for example, sodium acetate), no further catalyst need be added. If, however, the hydroxyalkylation step was carried out in the presence of amines, alkali metal hydroxides should be added to complete the reaction. The reaction mixture is held at the reaction temperature for 1 to 2 hours.

After the hydroxyester is formed, it is dissolved. Various inert solvent may be used, for example, aliphatic solvents and mixtures thereof, such as mineral spirits; aromatic solvents, such as xylene and toluene; oxygenated solvents, such as Cellosolve® acetate; chlorosolvents, such as trichloroethylene and perchloroethylene; and the like.

PART V

The transesterified product is now reacted with organic polyisocyanate.

From about 0.95 to about 1.1 isocyanate groups on the organic polyisocyanate are reacted with each hydroxyl group of the transesterified product. A lower ratio may result in too many free hydroxyl groups, whereas a higher ratio may result in too many unreacted isocyanate groups in the product.

The preferred polyisocyanate is the commercially available mixture of 2,4 and 2,6 toluene diisocyanate (which has about 80 percent of the 2,4 species), although the pure 2,4 or 2,6 species can be used. Examples of other polyisocyanates which may be used in this invention include methylene bis(p-phenyl isocyanate);
n-hexyl diisocyanates;
1,5-naphthalene diisocyanates;
1,3-cyclopentylene diisocyanate;
p-phenylene diisocyanate;
2,4,6-tolylene triisocyanate;
4,4',4''-triphenyl-methane triisocyanate.

The transesterified product, dissolved in the appropriate solvent, can be added to the isocyanate under a dry inert gas atmosphere. It is preferred, however, to add the isocyanate to the dissolved transesterified product. A 1–2 hour addition period is generally employed to control exotherm, but longer and shorter addition periods can be employed. During the addition, the reaction temperature is from 24 to 120 degrees centigrade. Preferably, the reaction temperature should be from 40 to 100 degrees centigrade; and even more preferred range is 50 to 70 degrees centigrade. The reaction mixture is held at the reaction temperature until the isocyanate value is zero; this normally takes 2 to 3 hours, but the time may be shorter or longer depending upon the reaction temperature used.

The following examples are given as illustrative of the invention, and are not deemed to be limitative thereof. Examples 1 to 12 will illustrate preparation of some of the hydroxyalkylated novolak reaction products that can be used in this invention; Examples 13 to 29 will illustrate the reactions of said products with transesterifying agents and organic polyisocyanates to form the desired oil modified polyurethane coatings. In these examples all parts and percentages are by weight, and all temperatures are in degrees centigrade, unless otherwise noted.

EXAMPLE 1

Charge 9410 parts phenol, 47.1 parts of oxalic acid, and 18.8 parts of Nacconol NRSF (sodium alkyl aryl sulfonate) to the reactor and heat to 90° C. A low nitrogen gas flow is maintained throughout the novolak polyol preparation except when operating under vacuum or under pressure. 4628 parts of 37.2% formaldehyde are added to the phenol-NRSF-oxalic acid mixture at such a rate as to maintain reflux. After all the formaldehyde has been added, the reaction mixture is refluxed for 1 hour or until a free formaldehyde content of less than 0.5% is achieved. The reaction mixture is then dehydrated under partial vacuum (16 inches of mercury) until the pot temperature exceeds 100° C. Full vacuum is then applied. The novolak is dehydrated and dephenolated at 190–200° C. and 40–46 mm. of mercury pressure; 30 minutes exposure to such conditions is sufficient to reduce the free phenol content to less than 1%. The novolak so prepared is a snowy white brittle resin.

The novolak is cooled to about 150° C., and 4.7 parts of sulfuric acid are added. 3977 parts of styrene are added over a 1 hour period, during which cooling is applied to maintain temperatures below 165° C. The reaction mixture is held for an additional 30 minutes at 160–165° C. The styrenated novolak is a pale straw colored brittle resin.

A vacuum (20 inches of mercury) is applied. The reactor is then sealed from the condenser and vacuum lines. 151.9 parts of triethylamine are added to the styrenated novolak at a temperature of 140–165° C. The reactor is sealed, and a vacuum (20 inches of mercury) is applied. The reactor is then sealed from the condenser and vacuum lines. 4390 parts of ethylene oxide are fed through the sparger over a 2 hour period or at a rate sufficient to maintain a maxium pressure of 25 pounds/square inch gauge. The reaction is exothermic and cooling is employed to maintain reasonable temperature. After the addition of the oxide is compared, the reaction is then run for an additional 2.5 hours at 150° C. and "allowed to digest." The reactor is then vented carefully using nitrogen gas, and a sample is withdrawn to test for phenolic hydroxyl content (PHC). If the PHC is below 0.3%, the resin is cooled to about 120° C. and discharged from the reactor. The novolak polyol is a pale straw brittle resin with a clear point of 39° C. and a hydroxyl number of 279.

EXAMPLES 2–12

In the following examples, the procedure specified in Example 1 was essentially followed, but different concentrations of reactants and/or different reactants were used, as specified in Table I. Note, however, that the procedure used in the hydroxyalkylation step in Examples 8, 9 and 12 differs from that used in Example 1, as explained in footnote 1.

TABLE I

| Example number | Parts of— | | | | | | Novolac reacted with hydroxy-alkylating agent | Hydroxyalkylating agent | Catalyst | Color of resin | Clear point, °C. | Hydroxyl number of resin |
|---|---|---|---|---|---|---|---|---|---|---|---|---|
| | 37.2% formaldehyde | Oxalic acid | Nacconol NRSF | Sulfuric acid | Phenol | Styrene | | | | | | |
| 2 | 9,256 | 94.2 | 37.6 | 9.4 | 18,820 phenol | 15,908 | All | 8,068 ethylene oxide | 383.3 triethylamine | Light straw | 57 | 225 |
| 3 | 1,356.2 | 11.29 | 4.52 | 1.06 | 2,258.6 phenol | 1,062.2 | 1,560 | 528 ethylene oxide | 20.9 triethylamine | do | 59 | 280.4 |
| 4 | 1,269.0 | 11.29 | 4.52 | 1.01 | do | 1,009.2 | 1,560 | 528 | do | do | 55 | 280.4 |
| 5 | 365.1 | 6.23 | 1.12 | ---- | 1,246.8 octyl phenol | ---- | 433.6 | 139.2 propylene oxide | 11.0 triethylamine | do | 53 | 196 |
| 6 | 6,480 | 65.9 | 26.4 | 8.25 | 13,175 phenol | 5,531 | All | 5,619 ethylene acetate | 77.4 sodium acetate | do | 49 | 278 |
| 7 | 694.2 | 7.1 | 2.80 | 0.71 | 1,412 phenol | 596.5 | All | 797.5 propylene oxide | 26.1 sodium benzoate | do | 65 | 247 |
| 8¹ | 243.5 | 3.0 | 1.2 | ---- | 600.8 pt. butylphenol | ---- | All | 277 ethylene carbonate | 1.51 potassium carbonate | do | 85 | 276 |
| 9¹ | 487 | 3.76 | 1.51 | ---- | 412 nonyl phenol, 376.4 phenol | ---- | 680 | 370 ethylene carbonate | 2.1 potassium carbonate | do | ---- | 261 |
| 10 | 7,124 | 63.3 | 25.3 | 2.76 | 12,630 phenol | 5,719 | All | 5,806 ethylene oxide | 85.6 sodium acetate | do | 56 | 272 |
| 11 | 13,884 | 141.3 | 56.4 | 14.1 | 28,230 phenol | 11,931 | All | 12,102 ethylene oxide | 455.7 triethylamine | do | 43 | 289 |
| 12¹ | 487 | 3.76 | 1.51 | ---- | 376.4 phenol, 834 octylphenol | ---- | 641.2 | 370 ethylene carbonate | 2.0 potassium carbonate | do | ---- | 281 |

¹ In these examples, the procedure for hydroxyalkylating the novolak is slightly different from that described in Example 1. Herein, one merely heats a mixture of the novolak, ethylene carbonate, and potassium carbonate to 180° C., holds at this temperature for one hour, then raises the temperature to 190° C. and holds at this temperature for two hours.

EXAMPLE 13

398 parts of resin, produced as per Example 1, were added to 876 parts of alkali refined linseed oil and 0.8 part of sodium methylate. This mixture was agitated and heated at a temperature of 250° C. for two hours under an atmosphere of nitrogen; and then it was cooled to room temperature.

318.5 parts of the transesterification product were dissolved in an equivalent number of parts of mineral spirits, and heated to a temperature of 38° under an atmosphere of nitrogen. To this mixture were added 43.5 parts of toluene diisocyanate which had been dissolved in 43.5 parts of mineral spirits for one hour at a temperature of 38.5–45° C. The reaction temperature was then increased to 84° C., and the reaction mixture was held at 80–84° C. for an additional hour. The reaction mixture was cooled to room temperature, filter aid was added, and the mixture was filtered.

The polyurethane solids, composed of 27.5% novolak resin, 60.5% alkali refined linseed oil, and 12.0% toluene diisocyanate, exhibited a viscosity, Gardner of <A, and a color, Gardner, of 4+ (tests run at 49.8% non-volatile in mineral spirits).

The vehicle so prepared was cured for 2 weeks, using lead and cobalt napthenate driers and an antiskinning agent. Both the final product and a commercial polyurethane (commercial) which had been cured in same manner as the vehicle of invention, were immersed in 5% caustic. After 109 minutes the commercial material was yellow to brown, soft, and exhibited complete loss of adhesion; but the aforementioned product, though slightly yellow and soft, had moderately good adhesion properties.

EXAMPLES 14–23

In the following examples, the procedure specified in Example 13 was essentially followed but different concentrations of reactants and/or different reactants were used, as specified in Table II. Physical property determinations (e.g., Gardner viscosity) were done in the specified solvent at the specified concentration thereof.

EXAMPLE 24

4405 parts of the resin produced as per Example 6 and 7532 parts of alkali linseed oil were agitated and heated at 244–251° C. under a nitrogen atmosphere for 1½ hours. Samples (90.9 parts) were withdrawn during and after the transesterification reaction. The transesterification product was cooled to room temperature, and 11,916 parts of mineral spirits were added to it. The reaction mixture was agitated and heated to 60° C. under a nitrogen atmosphere, and 69.8 parts of dibutyl-tin-dilaurate was added. 2043 parts of toluene diisocyanate (which had been dissolved in 1843 parts of mineral spirits) was added to the reaction mixture over 77 minutes at 60–62° C. 200 parts of mineral spirits were then added, and the reaction mixture was held at 59–62° C. for 4 hours and 21 minutes. The mixture was then cooled overnight. The reaction mixture was then heated to 45–48° C., filter aid was added, and the reaction mixture filtered.

The polyurethane solids formed were composed of 31.3% novolak resin, 53.6% alkali refined linseed oil, 14.6% toluene diisocyanate, and 0.5% dibutyl-tin-dilaurate, and exhibited a viscosity, Gardner, of K+ 0.4 sec., a color, Gardner, of 5–6, and a zero isocyanate value (physical measurements done at 50% non-volatile in mineral spirits).

The polyurethane was dried to form a coating and, along with several commercial coatings, was subjected to various chemical resistance tests, the results of which are presented below (Table III). The commercial polyurethane coatings are designated as "Commercial A," and "Commercial B."

TABLE II

| Example number | Parts of— | | Sodium methylate | Percent | | | | Viscosity of product Gardner | Color of product |
|---|---|---|---|---|---|---|---|---|---|
| | Resin | Drying oil | | Resultant transesterification product used | Toluene diisocyanate | Novolak resin in polyurethane solid formed | Drying oil in polyurethane solid formed | Toluene diisocyanate in polyurethane solid formed | |
| 14 | 502 (from Ex. 2) | 876 (linseed oil) | 1.0 | 689 | 95.7 | 31.9 | 55.8 | 12.2 | A (at 50.4% nonvolatile in mineral spirits) [2] | 6+ |
| 15 [1] | 627.5 (from Ex. 2) | do | 1.26 | 601.4 | 95.7 | 36.0 | 50.3 | 13.7 | B (at 50.3% nonvolatile in mineral spirits) | 5+ |
| 16 | 497.5 (from Ex. 11) | 863 (soybean oil) | 1.0 | 544.2 | 95.7 | 31.1 | 53.9 | 15.0 | G+ (at 50.2% nonvolatile in mineral spirits) | 3+ |
| 17 | 499 (from Ex. 4) | 876 (linseed oil) | 1.0 | 550 | 95.7 | 31.0 | 54.2 | 14.8 | B (at 41% nonvolatile in mineral spirits) | 4+ |
| 18 | 499 (from Ex. 6) | do | 1.0 | 550.4 | 95.7 | 30.9 | 54.3 | 14.8 | D (at 45.0% nonvolatile in mineral spirits) | 4+ |
| 19 | 178.9 (from Ex. 5) | 219 (linseed oil) | 0.36 | 159.2 | 23.9 | 39.1 | 47.8 | 13.1 | A (at 50.2% nonvolatile in mineral spirits) | 5–6 |
| 20 [3] | 251.2 (from Ex. 8) | 438 (linseed oil) | 0.5 | 275.2 | 47.8 | 31.0 | 54.2 | 14.8 | C (at 44.8% nonvolatile in mineral spirits) | 5 |
| 21 | 208.7 (from Ex. 9) | do | 0.54 | 292.0 | 43.5 | .33 | 53.7 | 14.3 | A (at 50.2% nonvolatile in mineral spirits) | 7+ |
| 22 | 250 (from Ex. 12) | do | 0.50 | 286.0 | 43.5 | 31.4 | 54.9 | 13.6 | H– (at 49.7% nonvolatile in mineral spirits) | 4 |
| 23 | 283.9 (from Ex. 7) | do | | 361.0 | 43.5 | 34.2 | 52.7 | 13.1 | H (at 55.4% in mineral spirits) | 5 |

[1] Both "Commercial E" and this product were exposed to 5% caustic. Over 4 hours exposure had no effect on this product, whereas the "Commercial E" became hazy, yellow and soft after three to five hours, the yellowing was noticeable within 15 minutes, and film erosion was noticeable within one hour.
[2] 50.4% nonvolatile in mineral spirits, e.g., means that measurements were made in a solution of which 50.4% was the nonvolatile polyurethane solid and the rest was mineral spirits.
[3] The product formed as per Example 19 and "Commercial E," a commercial polyurethane coating, were exposed to 5% caustic. After 3 hours, the product showed no signs of deterioration; whereas the "Commercial E" showed moderate to severe yellowing after 30 minutes, and the film formed by it dissolved after 3 hours.

NOTE.—The compounds of Examples 15 and 20 were air-dried, using conventional driers to form clear varnish-type protective surfaces, with good abrasion resistance, hardness, and flexibility properties.

TABLE III.—CHEMICAL RESISTANCE ON STEEL PANELS

| Chemical type and time | Commercial A | Commercial B | Product of Example 24 | Product of Example 25 |
|---|---|---|---|---|
| 5% NaOH, 2 hrs | Severe yellowing, film almost completely dissolved. | Slight to moderate yellowing, slight microblistering, part of film dissolved. | Trace yellowing | No effect. |
| 5% NaOH, 4 hrs | Complete failure | Complete failure | Trace to slight yellowing | Do. |
| 15% NaOH, 2 hrs | Severe yellowing, film almost completely dissolved. | Slight to moderate yellowing, slight microblistering, part of film dissolved. | Slight yellowing small amount of film dissolved. | Do. |
| 15% NaOH, 4 hrs | Failed | Failed | Moderate to severe yellowing, part of film dissolved. | Do. |
| 15% HCl, 3 hrs | No effect | No effect | No effect | Do. |
| 50/50 ETOH/H₂O, 3 hrs | Microblistering above liquid level, slight yellowing below liquid level. | do | do | Do. |
| 50/50 ETOH/H₂O, 48 hrs | Blister #8–MD some corrosion. | Slight microblistering, some corrosion. | Slight microblistering, some corrosion. | Do. |
| 5% lactic acid, 24 hrs | Trace yellowing | No effect | No effect | Do. |

TABLE IV

| | Parts of— | | | | | Percent | | | | | |
|---|---|---|---|---|---|---|---|---|---|---|---|
| Example number | Novolak resin | Oil | Transesterified product | Dibutyl tin-di-laurate | Toluene diisocyanate | Novolak resin in polyurethane solids | Oil in polyurethane solids | Diisocyanate in polyurethane solid | Dibutyl tin dilaurate in polyurethane solid | Viscosity | Color | Isocyanate value |
| 25 [1] | 4,915 | 7,003 safflower | | 69.2 | 2,073 | 34.9 | 49.8 | 14.8 | 0.50 | Y − 1.4 sec. (at 51.2% non-volatile in mineral spirits) | 2–3 | 0 |
| 26 [2] | 10,556 | 14,842.6 safflower oil | 25,297.8 | 140.4 | 4,466 | 35.2 | 49.5 | 14.8 | 0.50 | Z4+ 6.0 sec. (at 50.3% non-volatile in mineral spirits) | 2–3 | 0 |
| 27 | 606 | 876 safflower oil | 787.1 | 4.62 | 134.3 | 35.0 | 50.0 | 14.9 | 0.50 | U+ 1.3 sec. (at 42.3% non-volatile in trichlor X–1) | 3–4 | <0.077 |
| 28 | 824.9 | 1,175 safflower oil | 345.5 | 2. | 60.4 | 34.9 | 49.8 | 14.8 | 0.50 | Z2− 0.2 sec. (at 59.97% non-volatile in xylene) | 4–5 | |

[1] Example 25. See Table V for chemical resistance properties.
[2] Example 26. See Table V for chemical resistance properties.
[3] Prepared as per Example 10, Table I.

TABLE V.—CAUSTIC RESISTANCE OF OIL MODIFIED POLYURETHANES

| | | | | Product formed as per— | |
|---|---|---|---|---|---|
| | Commercial C | Commercial A | Commercial B | Example 26 | Example 28 |
| 3 day cure | | | | | |
| 5% NaOH, 2 hours | Film is soft | Slight yellowing | Soft and yellow, film easily removed. | No effect | No effect. |
| 5% NaOH, 4 hours | do | Moderate to severe yellowing. | Complete failure, film yellow and easily removed. | do | Do. |
| 6 day cure | | | | | |
| 10% NaOH, 2 hours | 50% of film destroyed | Slight yellowing, 50% of film rubs off easily. | Severe yellowing and hazing, film rubs off easily. | No effect | No effect. |
| 10% NaOH, 4 hours | Moderate yellowing, can be rubbed through to metal. | Moderate to severe yellowing, soft, can be rubbed through to metal. | Yellow and hazy, film washes off with water. | Some slight blushing which disappears within 15 minutes. | Some slight blushing which disappears within 15 minutes. |
| 2 week cure | | | | | |
| 15% NaOH, 2 hours | 50% of film washes off easily. | Very soft, crazed slightly yellow, some of film washes off easily. | Moderate yellowing and hazy, film washes off readily with water. | Slight softening | Slight softening. |
| Average thickness in mils | 0.47–0.65 | 0.50–0.73 | 0.62–0.91 | 0.42–0.52 | 0.49–0.69. |

NOTE.—Tests run on standard 3″ x 5″ steel Parker panels using cobalt naphthenate as drier. Panels were dip-coated. Edges were taped and panels were 50% immersed in the respective reagent for the specified times.

EXAMPLES 25-28

In Examples 25-28, the resin synthesized as per Example 6 was used (with the exception of Example 26, in which the resin prepared as per Example 10 was used); the procedure for reacting the novolak resin with drying oils and organic polyisocyanates spelled out in Example 23 was essentially followed, but different reactants and/or different concentrations of reactant, as specified in Table IV, were used.

Tables III and Table V compare the caustic resistance properties of some of the polyurethane coatings (prepared by curing the aforementioned compounds) with those of some commercial polyurethane coatings.

EXAMPLE 29

A mixture of 255 parts of resin prepared as per Example 6, 46.5 parts of 99% glycerine, and 427.5 parts of Sylfat 96 (tall oil fatty acids) was agitated and heated under a nitrogen atmosphere at 197-200° C. until the acid number dropped to 0.0054 part potassium hydroxide/ part of sample. Water of reaction was removed via a Dean-Stark trap. 292.2 parts of the ester, after cooling, was dissolved in 84.5 parts of mineral spirits, agitated, and heated to 62.5° C. at which time 1.69 parts of dibutyltin-dilaurate was added. 45.7 parts of toluene diisocyanate was added to the reaction mixture over a 20 minute period at 61-65° C. The reaction was then held at 61-61.5° C. for 1.75 hours at which time 255.1 parts of mineral spirits were added. After reheating to 60° C., the reaction mixture was held at 60° C. for 79 minutes and then filtered.

The polyurethane solids—composed of 30.1% of the novolak resin, 5.4% glycerine, 50.5% tall oil fatty acids, and 13.5% toluene diisocyanate— exhibited a viscosity, Gardner, of D+( a color, Gardner, of 2, and an isocyanate value of 0.04% (measurements done at 50.1% nonvolatile in mineral spirits).

While there have been described various embodiments of the present invention, the methods and compositions described are not intended to be understood as limiting the scope of the invention as it is realized that changes therein are possible. It is further intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:

1. An oil modified novolak polyurethane having superior caustic resistance which is a product of the process of reacting from about 0.95 to 1.1 isocyanate groups on an organic polyisocyanate with each hydroxyl group on a polyol, wherein the polyol is formed by reacting from 1.1 to 4 moles of a phenol with each mole of an aldehyde so as to form a novolak resin which has from about 1.1/1 to 2/1 phenolic groups per aldehydic groups per molecule, alkylating the novolak resin with from about 0.1 to 2 moles of alkylating agent per mole of phenolic nucleus on the novolak resin wherein the alkylating agent is of the formula:

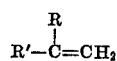

wherein R is selected from the group consisting of hydrogen, halogen, alkyl, alicyclic, aryl, and aralkyl and R' is selected from the group consisting of hydrogen and alkyl, hydroxyalkylating the novolak resin with from about 1 to 6 moles of hydroxyalkylating agent per mole of phenolic hydroxyl on the novolak resin wherein said hydroxyalkylating agent is selected from the group consisting of monooxirane ring compounds, alkylene halohydrins and alkylene carbonates, and transesterifying the hydroxyalkylated product with from 0.33 to 1 mole of transesterifying agent per mole of hydroxyl on the hydroxyalkylated product, wherein said transesterifying agent consists essentially of a drying oil, a semi-drying oil, mixtures of a drying oil and a semi-drying oil, mixtures of a drying oil and a non-drying oil, a heat polymerized oil or a blown oil.

2. The product of claim 1 wherein:
   (a) the phenol is heated to about 41-165° C. before the aldehyde is added, and after the reaction is completed the free phenol is removed by vacuum distillation at a temperature of 150-200° C.;
   (b) the reaction temperature for the alkylation step is from 50-200° C.;
   (c) the alkylated novolak is heated to 140-165° C., and after the hydroxyalkylating agent is added the reaction temperature is from 110-200° C. and the reaction pressure is from 2 to 25 pounds per square inch gauge;
   (d) the reaction temperature for the transesterification step is from 200-300° C.; and
   (e) the reaction temperature for the isocyanate reaction is from 24-120° C.

3. The product of claim 2 wherein the transesterifying agent is selected from the group consisting of drying oils and semi-drying oils.

4. The product of claim 3 wherein the phenol has the formula:

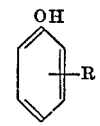

wherein R may be H, F, Cl, Br, or a suitable substituent selected from the following:
   (a) alkyl groups of 1 to 18 carbon atoms, in any of their isomeric forms, substituted on the phenolic nucleus in the ortho, meta, or para positions;
   (b) alicyclic groups of 5 to 18 carbons;
   (c) aromatic or aralkyl groups of 6 to 18 carbon atoms;
   (d) alkyl, alicyclic, araryl, and aralkyl ketones wherein the hydrocarbon moiety thereof is defined hereinbefore;
   (e) alkyl, alicyclic, aryl, and aralkyl carboxylic groups wherein the hydrocarbon portion thereof is defined hereinbefore;
   (f) and mixtures thereof.

5. The product of claim 4 wherein the aldehyde is formaldehyde.

6. The product of claim 5 wherein the phenol is phenol.

7. The product of claim 6 wherein the alkylating agent is styrene.

8. The product of claim 7 wherein the drying or semi-drying oil is selected from the group consisting of safflower oil, linseed oil, and soybean oil.

9. The product of claim 8 wherein the organic polyisocyanate is toluene diisocyanate.

10. The product of claim 9 wherein:
   (a) from about 1.44 to 1.64 moles of phenol are reacted with each mole of aldheyde, so as to form a novolak which has from about 1.25 to 1.33 phenolic groups per aldehydic groups per molecule;
   (b) from about 0.4 to 0.6 mole of styrene are reacted per mole of phenolic unit on the novolak;
   (c) from about 1 to 1.5 moles of hydroxyalkylating agent are reacted per mole of phenolic hydroxyl on the alkylated novolak; and
   (d) from about 0.33-0.42 mole of drying oil or semi-drying oil are reacted per mole of hydroxyl on the hydroxyalkylated product.

11. The product of claim 10 wherein:
(a) the phenol is heated from about 95–100° C.;
(b) after the phenol-aldheyde condensation reaction is completed, free phenol is removed by vacuum distillation at a temperature of 190–200° C.;
(c) the reaction temperature for the alkylation step is from 120–175° C.;
(d) the reaction temperature for the hydroxyalkylating step is from 150–180° C., and the reaction pressure is 25 pounds per square inch,
(e) the reaction temperature for the transesterification step is from 240–250° C.; and
(f) the reaction temperature for the isocyanate reaction is from 50–70° C.

References Cited

UNITED STATES PATENTS

| | | | |
|---|---|---|---|
| 3,533,972 | 10/1970 | Pawlak et al. | 260—19 |
| 3,476,696 | 11/1969 | Quinn | 260—19 |
| 3,248,276 | 4/1969 | Bean | 260—844 |

FOREIGN PATENTS

| | | | |
|---|---|---|---|
| 731,709 | 4/1966 | Canada | 260—2.5 |

DONALD E. CZAJA, Primary Examiner

W. E. PARKER, Assistant Examiner

U.S. Cl. X.R.

117—132 BF; 260—51 R